United States Patent [19]
Cox et al.

[11] Patent Number: 5,734,592
[45] Date of Patent: Mar. 31, 1998

[54] METHOD FOR DETERMINING A RANKED SET OF ASSOCIATIONS

[75] Inventors: Ingemar J. Cox, Lawrenceville, N.J.; Matthew L. Miller, Vilnius, Lithuania; Harold S. Stone, Princeton, N.J.

[73] Assignee: NEC Research Institute, Inc., Princeton, N.J.

[21] Appl. No.: 502,224

[22] Filed: Jul. 13, 1995

[51] Int. Cl.$^6$ ........................................................ G01D 7/02
[52] U.S. Cl. ..................... 364/554; 364/552; 364/551.01; 705/7
[58] Field of Search .................... 364/554, 468, 364/551.01, 552, 581, 470, 471–473, 551.02, 468.05, 468.15, 400, 488, 491; 705/1, 7, 8; 395/10, 13, 20–24, 50; 342/90

[56] References Cited

U.S. PATENT DOCUMENTS

| | | | |
|---|---|---|---|
| 4,931,952 | 6/1990 | Hyder | 364/517 |
| 5,077,661 | 12/1991 | Jain et al. | 364/402 |
| 5,351,202 | 9/1994 | Kurtzberg et al. | 364/552 |
| 5,379,044 | 1/1995 | Carlson et al. | 342/90 |
| 5,479,361 | 12/1995 | Kurtzberg et al. | 364/552 |
| 5,546,329 | 8/1996 | Kurtzberg et al. | 364/552 |

OTHER PUBLICATIONS

D.B. Reid "An Algorithm for Tracking Multiple Targets," IEEE Trans. on Automatic Control, vol. AC–24, No. 6, Dec. 1979, pp. 843–854.

K.G. Murty, "An Algorithm for Ranking All the Assignments in Order of Increasing Cost," Operations Research, vol. 16, No. 3, May–Jun. 1968, pp. 682–687.

R. Jonker and A. Volgenant, "A Shortest Augmenting Path Algorithm for Dense and Sparse Linear Assignment Problems," Computing, vol. 38 (1987), pp. 325–340.

T. Mizuike, and Y. Ito, "Optimization of Frequency Assignment," IEEE Trans. on Communications, vol. 37, No. 10, Oct. 1989, pp. 1031–1041.

*Primary Examiner*—Emanuel T. Voeltz
*Assistant Examiner*—Bryan Bui
*Attorney, Agent, or Firm*—Philip J. Feig; Arthur J. Torsiglieri

[57] ABSTRACT

A computer-implemented process for determining a ranked set of solutions to a bipartite graph matching problem, such is involved in multi-target tracking, maximum flow matching, or data association in matching elements of a first set to elements of a second set to minimize the cost of the association. A feature of the process is a partitioning into subproblems such that the most probable solutions are in the smaller subproblems and the computation begins by solving the smallest subproblem in the search for the best solution.

12 Claims, 7 Drawing Sheets

1. Find the best solution, $S_0$, to $P_0$.

2. Initialize a priority queue of problem/solution pairs to contain only $< P_0, S_0 >$. The top pair on this queue will always be the pair with the lowest-cost solution.

3. Clear the list of solutions to be returned.

4. For i = 1 to k, or until the priority queue of problem/solution pairs is empty:
   {
   4.1. Take the top problem/solution pair, $< P,S >$, off the queue.
   4.2. Add S to the list of solutions to be returned.
   4.3. For each triple, $< y,z,l >$, found in S:
      {
      4.3.1. Let P' = P.
      4.3.2. Remove the triple $< y,z,l >$ from P'.
      4.3.3. Find the best solution, S', to P'.
      4.3.4. If S' exists:
         {
         4.3.4.1. Add $< P',S' >$ onto the queue of problem/solution pairs.
         }
      4.3.5. From P, remove triples that include y, and all triples that include z, except for $< y, z, l >$ itself.
      }
   }
}

METHOD FOR DETERMINING A RANKED SET OF ASSOCIATIONS

FIELD OF THE INVENTION

This invention relates to a computer-implemented process for determining a ranked set of solutions to a bipartite graph matching problem, such as is involved in multi-target tracking, maximum flow matching, or data association in optimally associating an element of a first set to an element of the second set to minimize the cost of the association.

Ranking the k-best solutions to an assignment problem is important in those instances where there are factors other than the lowest cost or maximum efficiency for the solution finally to be chosen for use. For example, in some instances one might be willing to adopt a solution of higher cost or less efficiency because of more favorable other constraints which cannot be represented in the solution to a bipartite graph, and in such instances knowledge of nearly-optimal solutions would be useful.

The invention also relates to an article of manufacture for directing a computer in which the process is embedded as a stored program.

BACKGROUND OF THE INVENTION

The problem of data association in bipartite graphs, also called the motion correspondence problem or the maximum flow problem, has been extensively studied.

An example of such a problem is that of providing the best match of particular moving features of two views taken at different times of a picture scene. Another example is finding the best assignment between employees and machines on which different employees have different skills so that it is important to provide suitable assignments.

For motion correspondence, two popular algorithms have emerged; the multiple hypothesis filter and the joint probabilistic data association filter. While the two algorithms are conceptually quite different, both need to enumerate all legal assignments of an ambiguity matrix. An ambiguity matrix is a concise representation of the ambiguity present in a scene. Columns of the matrix denote existing tracks and rows denote measurements for a particular iteration. A non-zero entry in a row i and column j denotes the fact that measurement $z_i$ validated to track $y_j$. A legal assignment of measurements to targets must satisfy the constraints that (1) a measurement can originate from only a single source target (often called the uniqueness constraints) and that (2) a target can give rise to no more than one measurement per cycle. These constraints require that a legal set of assignments, represented as a hypothesis matrix, have no more than a single non-zero entry in any row and/or column.

Each assignment, also called a hypothesis, has an associated cost, which is used in subsequent calculations. While enumeration of the set of legal hypothesis is straightforward, it is also NP-hard. It is therefore clear than an exhaustive enumeration of all legal hypotheses is computationally infeasible. However, many such hypotheses have very small probability and consequently very little affect on the overall calculation. This observation has led several researchers to investigate approximate multi-target tracking algorithms in which only a relatively small number of hypotheses with high probabilities are examined.

In an earlier paper published in IEEE Trans. on Aerospace and Electronic Systems 32(1)486–489 (1995), Cox and Miller have shown that the k-best hypothesis of the multiple hypothesis tracking algorithm could be efficiently generated in $O(N^4)$ worst case time, using an algorithm described in a paper by K. G. Murty entitled "An Algorithm for ranking all assignments in order of increasing cost", published in Operations Research, 16:682–687 (1968), which is being incorporated by reference herein. FIG. 1 shows the pseudocode for Murty's method of finding the k-best solutions to a linear assignment problem, $P_0$. The problem is expressed as a bipartite graph, represented as a list of triples, <y,z,l>. In a multi-target tracking application, each y represents a hypothesized target, each z represents a measurement, and l is the negative log-likelihood that z is a measurement of y. A solution, S, to such an assignment problem is a list of triples in which each y and each z appears exactly once. The cost of a solution is the sum of the l's in its triples. The k-best solutions are those with the k lowest costs.

The single best solution to $P_0$ is found using one of the classical methods of solving assignment problems, as will be described later. Subsequent solutions to $P_0$ are found by solving a succession of assignment problems that are created from $P_0$ by a process called "partitioning". This process was first described in the above paper by K. G. Murty, and is essentially as follows.

A problem, P, with best solution S and size n, is partitioned into a set of subproblems, $P_0^t, P_1^t, \ldots, P_n^t$, such that:

1. The union of the set of possible solutions to $P_0^t$ through $P_n^t$ is exactly the set of possible solutions to P minus the solution S, and
2. The sets of possible solutions to $P_0^t$ through $P_n^t$ are disjoint.

To make subproblem $P_t^t$, we copy P and remove from it the mth triple in S, $<y_j, z_m, l>$. This means that no solution to $P_t^t$ can contain $<y_j, z_m, l>$, so S cannot be a solution to $P_t^t$. Next, before making subproblems $P_t^t + 1$ through $P_n^t$, we force $<y_j, z_m, l>$ to be in the solutions to those subproblems. To do so, we remove from P all the triples $<y_j, z_h, l>$, h≠m and $<y_h, z_m, l>$, h≠j. Every possible solution to this modified P must contain $<y_j, z_m, l>$, so the sets of possible solutions to any subproblem $P_h^t$, where h>t, will be disjoint from the set of possible solutions to $P_t^t$.

We partition $P_0$ according to its best solution, $S_0$, and place the resulting subproblems, together with their best solutions, on a priority queue of problem/solution pairs. We then find the problem P in the queue that has the best solution. The solution to this problem P is the second-best solution to $P_0$. Now we remove P from the queue and replace it by its partitions. The best solution found in the manner described for finding the second best solution queue now is the third-best solution to $P_0$. And so on.

The key computation of Murty's algorithm is the determination of the least cost assignment. Most of the optimizations presented in our method depend on values that are used inside the least-cost assignment algorithm. It is therefore necessary to discuss some important aspects of the algorithm advantageously used for such assignment. This algorithm (JV) is fully described in a paper entitled "A Shortest Augmenting path Algorithm for dense and sparse linear assignment problems," published in Computing, vol. 38, pages 325–340 (1987) by R. Jonker and A. Volgenant, and this paper is incorporated herein by reference.

The JV algorithm, like most assignment algorithms, is based on linear programming. This characterization is most easily expressed if the problem is represented as an array of costs, c, where each c[i, j] is the cost of assignment $z_i$ to $y_j$. A solution, in this representation, is a matrix, x, in which each x[i,j] is either 1, meaning that $z_i$ is assigned to $y_j$, or 0, meaning that they are not assigned to each other. The linear programming problem is:

$$\text{Minimize } \sum_{ij} c[i,j] \times x[i,j] \text{ subject to } \begin{cases} \sum_j x[i,j] = 1 & (i = 1 \ldots N) \\ \sum_i x[i,j] = 1 & (j = 1 \ldots N) \\ x[i,j] \geq 0 & (i,j = 1 \ldots N) \end{cases}$$

The dual problem is:

$$\text{Maximize } \sum_i u[i] + \sum_j v[j] \text{ subject to } c[i,j] - u[i] \geq 0 \ (i,j = 1 \ldots N)$$

where u and v are the dual variables for the z's and y's, respectively. The difference $c[i,j]-u[i]-v[j]$ is referred to as the "slack" between $z_i$ and $y_j$.

The basic outline of the JV algorithm is as follows:
1. Use a computationally simple procedure to produce a partial solution to the problem and to initialize the dual variables.
2. While the current partial solution is incomplete (not all z's are assigned to y's),
   2.1. Add one new assignment to the solution by a process called "augmentation".
   2.2. Adjust the dual variables.

A variety of algorithms fall into the same or very similar basic outlines as this and are referred to as "shortest augmenting path" algorithms. These algorithms are distinguished by how steps 1, 2.1, and 2.2 are implemented, but fortunately, none of these steps is critical for the optimizations to Murty's method. For our purposes, there are only two important properties of the JV algorithm and other shortest augmenting path algorithms.

The first property is that the loop in step 2 is guaranteed to find the best solution as long as the initialization step (step 1) gives it a partial assignment, x, and initial values for the dual variables, u and v, that satisfy just two criteria:

1. for all i,j such that $x[i,j]=1$, then $c[i,j]=u[i]+v[j]$, and
2. for all i,j such that $x[i,j]=0$, the $c[i,j] \geq u[i]+v[j]$.

We call a partial solution and set of dual variable values that satisfy these criteria a "valid initialization" for the augmentation loop (step 2).

The second important property is that the slack between any z and y is useful in estimating the cost of the best solution in which they are assigned to each other. If the current lower bound on the cost of the partial solution, with $z_i$ and $y_j$ unassigned, is C, then the cost of the best solution that assigns $z_i$ to $y_j$ will be at least $C+c[i,j]-u[i]-v[j]$. The quantity $c[i,j]-u[i]-v[j]$ is the slack between $z_i$ and $y_j$ and thus a new lower bound can be computed by finding the minimum slack of a partial solution.

The JV algorithm only works on problems with equal numbers of y's and z's, and always yields a complete assignment. In a full implementation of the typical multiple hypotheses tracking algorithm, however, we generally have assignment problems with different numbers of y's and z's, and there is a cost associated with leaving any given y or z unassigned. Each target, y, has a finite likelihood of being missed in a given scan, and each measurement, z, has a finite likelihood of being a false alarm. Problems with unequal numbers of y's and z's can be converted into complete assignment problems by a simple process. For each $y_j$, we introduce a dummy node, $z_{-j}$, that will be used to represent the cost of leaving $y_j$ unassigned. If a problem contains the triple $<y_j, z_{-j}, l>$, then the cost of leaving $y_j$ unassigned is l. Similarly, we introduce a dummy node, $y_{-i}$, for each $z_i$. This gives us a problem with equal numbers of y's and z's.

The only solution to this new problem, however, leaves all y's and z's unassigned, or, rather, assigns each $y_j$ to $z_{-j}$ and each $z_i$ to $y_{-i}$. Any other solution cannot be complete, since, if $y_j$ is assigned to $z_i$, then $y_{-j}$ and $z_{-i}$ can't be assigned to anything, and the JV algorithm is looking for an assignment for all nodes, dummy or not. To avoid this, we introduce a zero-cost triple, $<y_{-j}, z_{-i}, 0>$, for each triple $<y_j, z_i, l>$ that appears in the problem. Now, if $y_j$ is assigned to $z_i$, then $y_{-j}$ can be assigned to $z_{-i}$, with no effect on the cost of the solution.

Note that it is important to remove these zero-cost assignments between dummy nodes from all solutions to problems before partitioning in Murty's algorithm. Otherwise, many "next-best" solutions will simply be different permutations of zero-cost assignments between dummy nodes.

As described in FIG. 1, Murty's method is independent of the algorithm chosen for solving assignment problems. In fact, Murty's algorithm can be used to find the k-best solutions to a large class of entirely different graph problems, simply by replacing the routine for finding the best assignment with a routine that solves a different problem. When used in the Murty method, the optimizations described herein provide a dramatic improvement in both the average-case and worst-case execution times.

SUMMARY OF THE INVENTION

The present invention provides an improvement in the Murty method for finding the k-best solutions after there has first been found the best solution $S_0$ to the problem, typically by a shortest path algorithm such as the JV algorithm described previously.

Moreover, as we partition the problem in accordance with the Murty algorithm, we can easily place lower bounds on the cost of the best solutions to its subproblems. These bounds can be used to avoid solving subproblems that are unlikely to produce the desired next-best result. Clearly, no subproblem that results from partitioning a given problem P can have a solution better than the solution to P itself. Thus, the cost C of the solution to P is an initial lower bound on the cost of the best solution to each of its subproblems, and a more precise lower bound of a problem is derived by the minimum slack of all alternative assignments after removal of the appropriate triple.

As successive solutions to the problem are computed, the average size of subproblems that are solved and partitioned decreases. As the problem size decreases, so does the computation time required to find a successive solution. It is possible to decrease computation time dramatically by carefully selecting the order in which the partitioning is performed.

In particular, we have found that by changing the order in which $<y,z,l>$ triples are used for partitioning, we can dramatically change the typical probability distribution in which larger problems are more likely to contain the best solution to a probability distribution in which the smaller problems are more likely to contain the best solution. The invention is based on this finding. At the beginning of each iteration, we examine the set of $<y,z,l>$ triples in S that have not been used. For each triple, we compute a lower bound in the cost of the best solution to the subproblem that would result from partitioning with it. This bound can be computed in the same manner as for the earlier optimization. We then choose the triple that results in the highest lower bound as the one to use in creating the next subproblem. This approach tends to ensure that the largest problem will have the worst solution. The largest problem has the largest number of unassigned arcs, but because it has the highest lower bound, it is likely to be dropped without the need for being solved completely.

The next largest subproblem made will tend to have the next-worst solution, and so on, until the smallest problem, which has a reasonable chance of having the best solution. The computation is then based on starting with the smallest problem in the search for the best solution.

This algorithm is then stored in storage apparatus, for example a magnetic disk or a read-only semiconductive chip, as a magnetic or electric charge pattern, for use to direct a suitable computer for providing the desired data association or ranked assignment of a given set of inputs.

In particular, the invention finds use in computer vision when there are to be matched in two views of picture-scene features that have moved between scenes. In this example, the ambiguity matrix would include columns that represent a set of measurements from the first scene and columns that represent a set of measurements from the second scene and an entry in the matrix would represent the distance between two sets of points represented by the row and column of the entry.

Alternatively, the rows and columns of the matrix might represent workers and tasks and the entries the cost of associating the corresponding worker to the corresponding task.

The invention will be better understood from the following more detailed description taken with the accompanying drawing.

BRIEF DESCRIPTION OF THE DRAWING

FIG. 1 is the pseudocode for Murty's prior art algorithm.

DETAILED DESCRIPTION OF THE INVENTION

Figure 2:
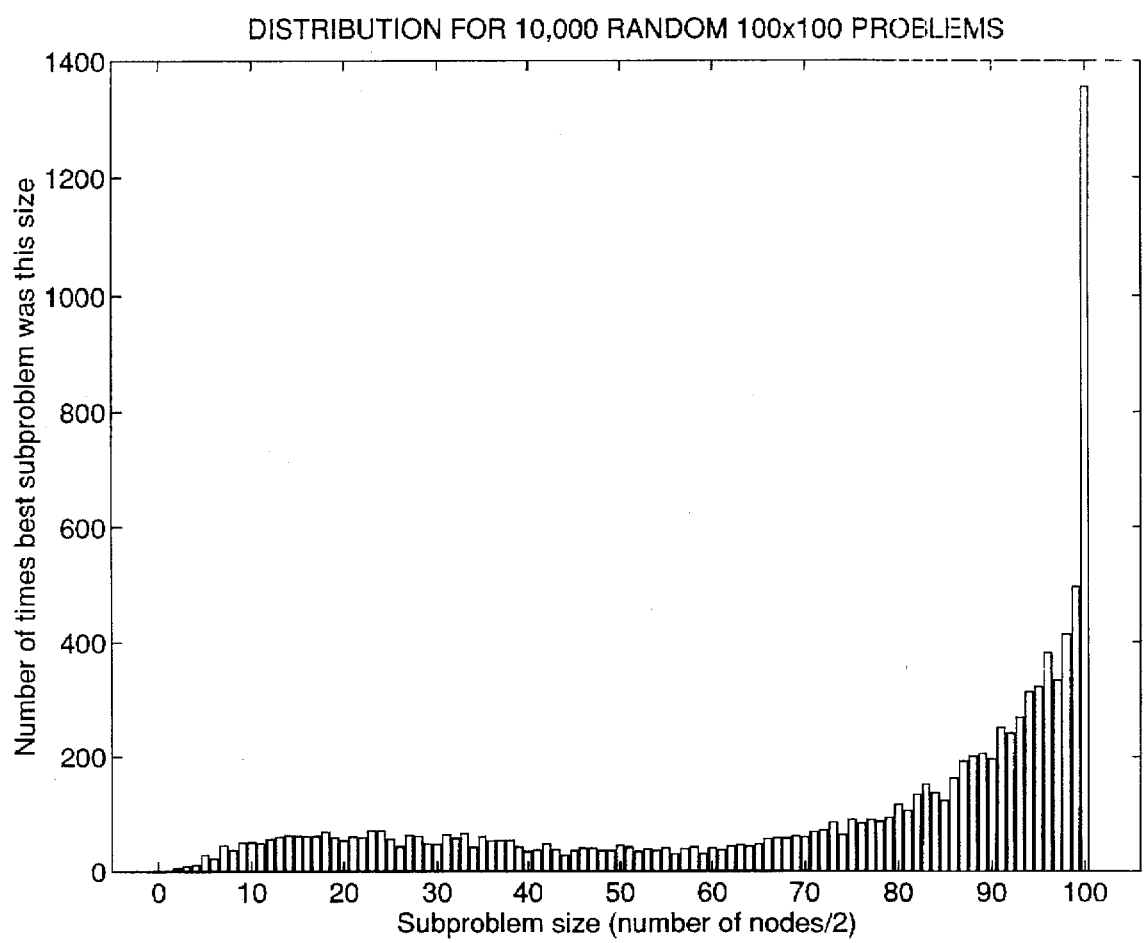
FIGS. 2 and 3 are histograms showing the distribution of the sizes of the best subproblem for 10,000 random 100×100 problems before and after the modification in accordance with the invention.

FIG. 1 has been discussed in connection with the background of the invention so that it needs no further discussion. Additionally, there has been discussed the JV algorithm for finding the least cost assignment for the best solution.

As mentioned earlier, when a problem is partitioned in Murty's algorithm, considerable work has already been expended to find its best solution. This computation can be exploited when finding the best solutions to the subproblems that result from the partitioning.

Consider a problem being partitioned, represented as a cost matrix, c, with a solution matrix x, and dual variables u and v. During each iteration of the loop in step 4.3 of FIG. 1, a new subproblem, P', is made with associated cost matrix c'. Removing the arc $<y_j,z_i,l>$ from the copied problem (step 4.3.2) is equivalent to setting c'[i,j] to infinity, since an infinite-cost entry in the matrix will never be part of the best solution. If we now let x'=x, u'=u, and v'=v, and we set x'[i,j]=0, then x', u', and v' form a valid initialization for solving P'. We can, therefore, skip the initialization step of the JV algorithm and go directly to the augmentation loops with only one arc left to assign in the problem.

The value of this optimization is that, after the first solution to the original assignment problem is found, we never have to perform more than one augmentation for each new subproblem. In the worst-case, the augmentation step of JV takes $O(N^2)$ time, so the worst-case time for Murty's algorithm is reduced to $O(kN^3)$.

Moreover, when we partition a problem, we can easily place lower bounds on the cost of the best solutions to its subproblems. These bounds can be used to avoid solving subproblems that are unlikely to produce the next-best result. Clearly, no subproblem that results from partitioning a given problem, P, can have a best solution better than the solution to P itself. Thus the cost, C, of the solution to P is an initial lower bound on the cost of the best solution to each of its subproblems.

More usefully, when we create an individual subproblem, P', by removing a triple $<y_j,z_i,l>$ from a copy of P, we can compute a more accurate lower bound by finding the minimum slack of all the alternative assignments for $z_i$, and adding that slack to C. In pseudocode, we have:

```
minSlack=INFINITY
For each triple <y_h, z_i, l>, h ≠ j in P'
{
    slack = l − u[i] − v[h]
    if slack < minSlack
        minSlack = slack
}
C' = C + minSlack
```

The cost of the best solution to P' cannot be less than C'.

To improve the performance of Murty's method using these cost bounds, we first change our priority queue from a queue of problem/solution pairs to a queue of <problem, partial solution, lower cost bound> triples. When a problem is created by partitioning, it is placed in the queue before we find its best solution. The queue is sorted by lower cost bounds, so the top problem on the queue is the one that is most likely to have the best solution.

To find the problem with the best complete solution on the queue, we start by removing the queue's top problem, P. If P has not yet been solved, then we find its best solution, S, along with the cost of that solution, C, and we place <P,S,C> back on the queue. The queue is then resorted, at which point, other problems have an opportunity to move to the front of the queue if their lower cost bounds are better than the actual cost of the best solution to P. At any point in time, the queue contains the k-best full solutions and all the subproblems yet to be solved whose lower bounds are better than the k-best solutions. We repeat the process of extracting a subproblem until the top k problems have been solved. These are the k-best solutions. The algorithm, in general, does not produce full solutions for all problems placed on the queue because problems are eliminated by bounds checks.

This optimization does not affect the worst-case performance of the algorithm, since we may still solve all the problems on the queue before finding the best solution. However, in the average case, we see a substantial reduction in the number of problems that must be solved.

As successive solutions to the problem are computed, the average size of subproblems that are solved and partitioned decreases. As the problem size decreases, so does the computation time required to find a successive solution. It is possible to decrease computation time dramatically by carefully selecting the order in which the partitioning is performed.

To understand why the problem size decreases, consider the first two iterations of the loop in step 4 of FIG. 1. When $P_0$ is partitioned, each subproblem that is created contains successively fewer nodes. The first problem has the same number of unassigned arcs as the original problem $P_0$, the second has one fewer y and one fewer z. So after the first iteration of the loop, the priority queue contains problems whose sizes range from 2×2 to the original size of $P_0$.

At the start of the second iteration of the loop, then, the problem at the top of the queue might be any of a range of sizes. If the probability of any given subproblem containing the best solution were the same as that of any other subproblem, then, on average, the top problem in the second iteration of the loop would have half as many nodes as $P_0$. However, the probabilities are not evenly distributed. Larger problems have many more possible solutions than do smaller problems, so they have higher probabilities of containing the best solution.

Because it is difficult to determine analytically the probability that subproblems of different sizes will have the best solutions, we studied the problem experimentally. FIG. 2 is a histogram of the frequency of subproblem sizes that contained the best solutions. It shows the results of an experiment in which 10,000 dense assignment problems of size 100×100 were partitioned and the least-cost solutions to all the resulting subproblems were found. We then tallied the number of times that the 100×100 size subproblem had the best solution, the number of times the 99×99 size subproblem had the best solution, and so on. The resulting histogram clearly indicates that larger problems have a much higher chance of having the best solution, and the expected size of the top problem in the second iteration of our loop is not much less than the size of the argument problem $P_0$.

Figure 3:
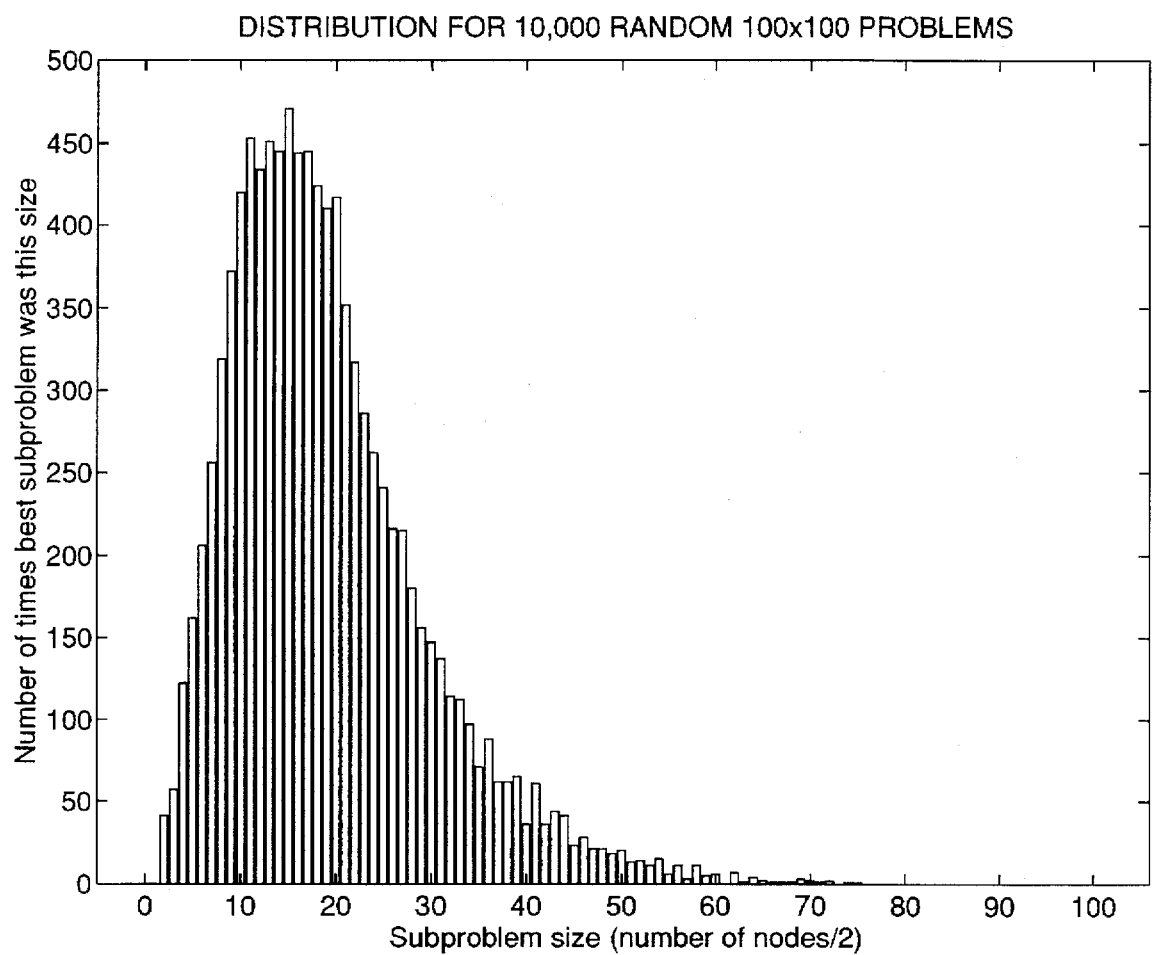
Figure 4A:
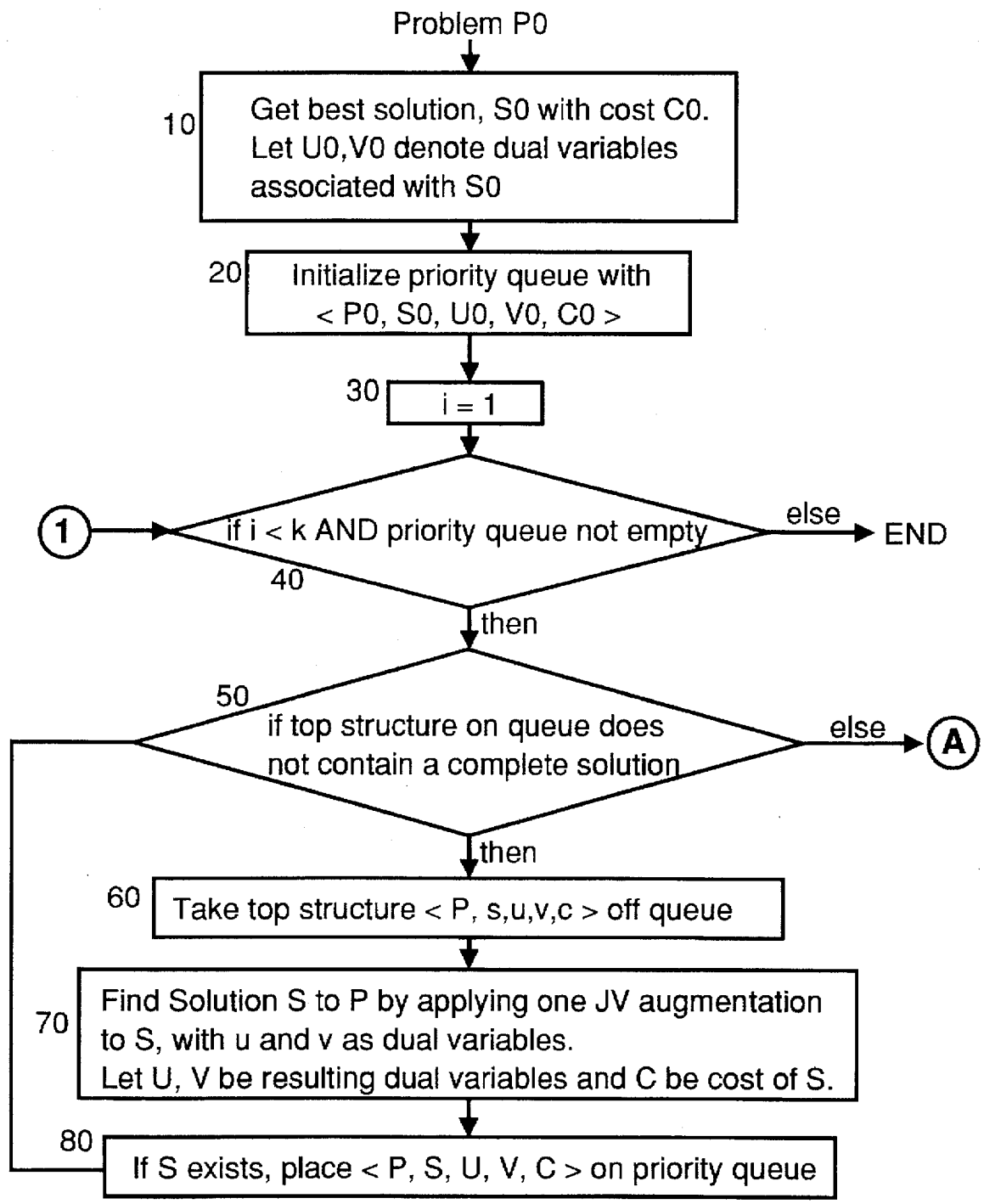
FIGS. 4A, 4B, 4C and 4D form a flow chart of the method of our invention.
Figure 4B:
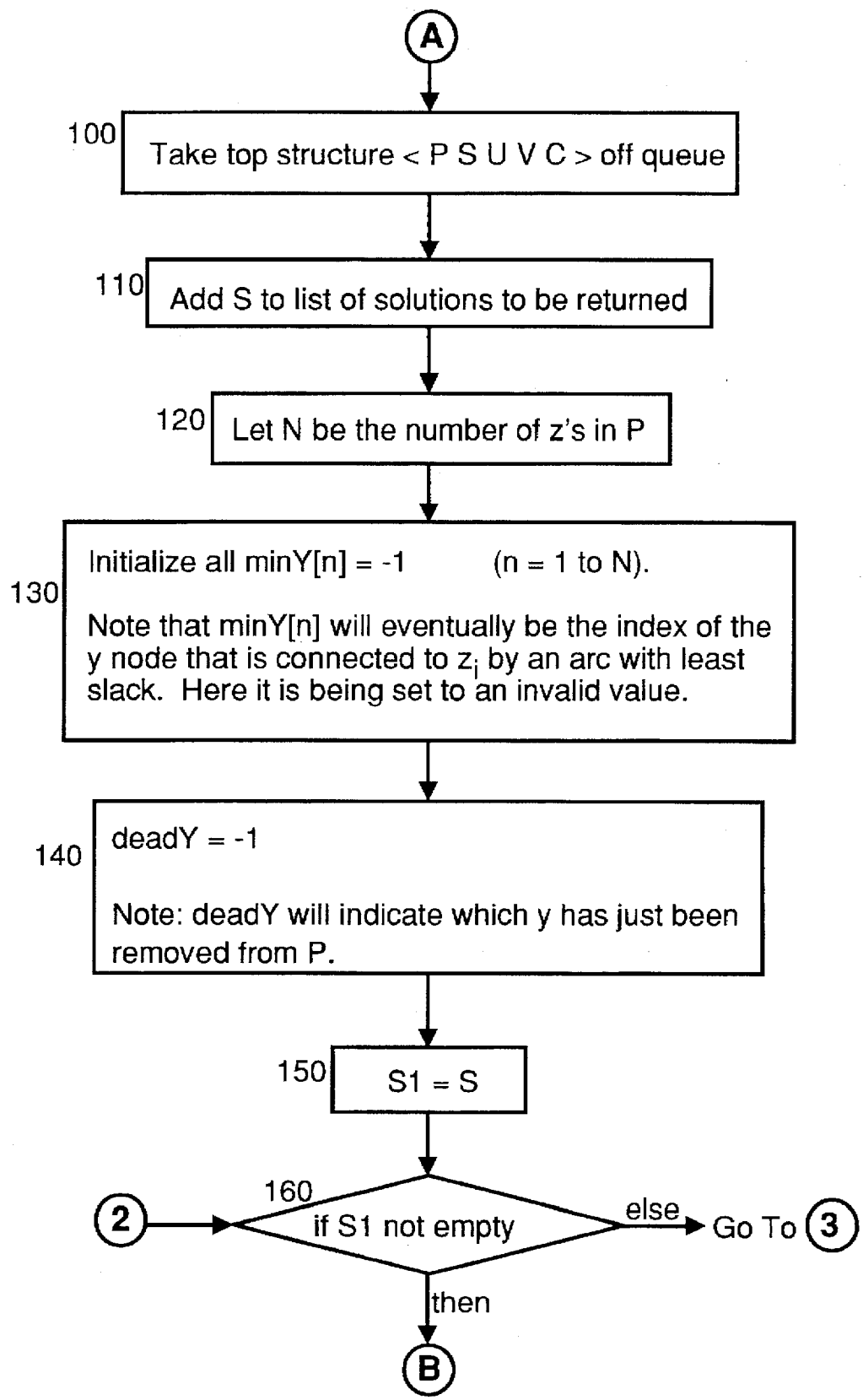
Figure 4C:
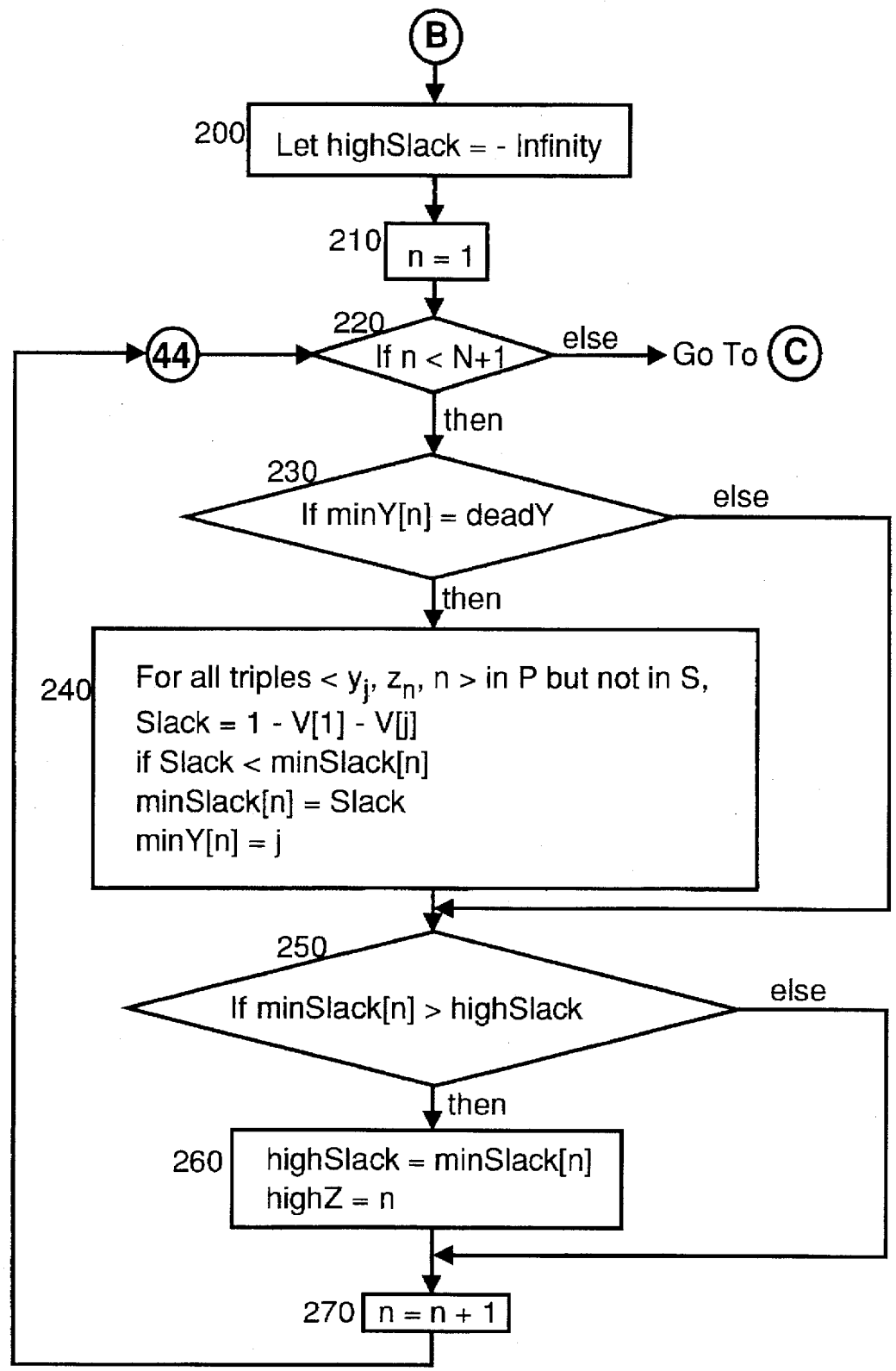
Figure 4D:
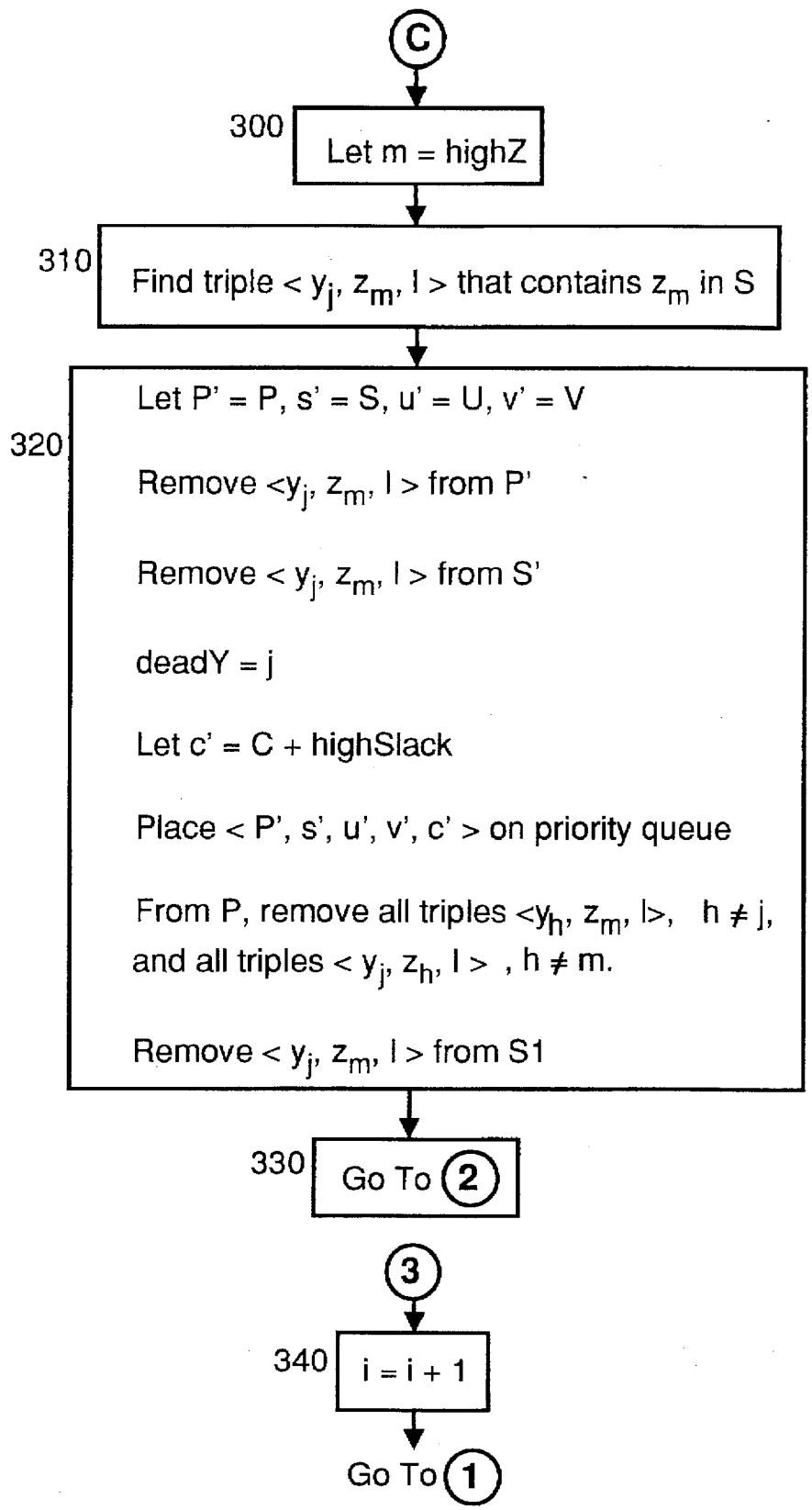

However, by changing the order in which <y, z,1> triples are used for partitioning, we can dramatically change this probability distribution, so that smaller problems are more likely to contain the best solution. At the beginning of each iteration loop 4.3, we examine the set of <y,z,1> triples in S that have not yet been used. For each triple, we compute a lower bound on the cost of the best solution to the subproblem that could result from partitioning with it. This bound can be computed in the same manner as for optimization just described. We then choose the triple that results in the highest lower bound as the one to use in creating the next subproblem. The histogram obtained by making this change is shown in FIG. 3.

FIG. 4 is a flow chart of the process in accordance with the invention just described for providing the k best solution. The flow chart described represents the Murty's algorithm with the addition of the various optimizations described. In particular, steps 10 to 120 represent the Murty algorithms with the first of the two optimizations of the prior art and the processing steps subsequent thereto involve the partitioning in an optimized order and represent the novel feature of the invention. At the start, the algorithm generates the initial assignment problem, $P_0$, and obtains its solution S0 with cost C0, and dual variables U0 and V0. The dual variables enable subsequent problems to be solved efficiently. Also, the dual variables provide a lower bound on the actual solution, which is used to focus the computation on subproblems that yield solutions among the k best solutions. Consequently, the use of dual variables greatly reduces the amount of effort required to find solutions to newly generated subproblems.

In step 10, the algorithm solves the first problem, denoted by <P0, S0, U0, V0, C0>, and in step 20 the solution is stored as the sole element of a priority queue. As subsequent entries are placed in this queue, they are ordered by priority in accordance with the estimated cost of a subproblem. For a subproblem awaiting solution, the estimated cost C' is a lower bound on the cost, which is obtained as described later. For a subproblem that has been solved completely, the estimated cost C is the actual cost of the subproblem.

When items are removed from the queue for examination, they are removed in priority order, that is, they are removed in order of estimated cost, starting with the lowest estimated cost. To find the kth best solution, items are removed from the queue one at a time. If a problem is not fully solved when it is first removed, it is solved, and placed back on the queue at the position determined by its actual cost.

When the item removed from the queue is a fully solved problem, the algorithm notes this to be the next best solution, and halts when its discovers the kth best solution for a specific value of k.

From a fully solved problem that is removed from the queue as the next best solution, the algorithm generates several new unsolved subproblems that have among them solutions that fall among the k best solutions. Each of these unsolved subproblems is placed on the queue in the order of estimated cost. A feature of the invention is how these subproblems are generated and what these subproblems are.

The number of the next full solution to be obtained is denoted by the variable i in the flowchart. In step 30 the variable i is initialized to the value 1 to indicate that the algorithm is seeking the first full solution during the first iteration of this loop.

The condition in step 40 is true when there is more work to be done, and false when nothing else remains. The false exit from the decision box takes the algorithm to an exit.

If more work remains, then the next action depends on whether the least-cost item in the queue is fully solved or not fully solved. The test in step 50, if top structure on queue does not contain a complete solution, is true if the top structure (the subproblem with the least-estimated cost of those remaining) describes a subproblem for which only a lower bound exists. If it is true, in step 60 the algorithm removes this subproblem from the queue. In step 70 it solves the problem to obtain an actual cost, and in step 80 it places the resulting solution on the queue in priority order. After step 80, the algorithm returns to step 50, to examine the item currently at the top of the queue. This loop is repeated until a fully solved subproblem is removed from the queue. When the fully solved problem is discovered, the process moves to Point A in the flowchart.

At Point A, the solution at the top of the queue is the ith best solution. In step 100, this solution is removed from the queue, and in step 110 it is added to the list of answers. From this solution, the algorithm generates a number of unsolved candidate problems whose solutions may be among the kth best. In general, each solution contains some arcs that are forced to be in the solution, and some arcs that are not forced to be in the solution. The latter arcs are breakable arcs. The algorithm generates a new subproblem for each breakable arc in the ith best solution by breaking that one breakable arc in each subproblem.

In step 120, the process counts the number of breakable arcs by counting the number of z nodes that terminate a breakable arc. Then it stores this value in the variable N. In the loop that follows, the algorithm generates N subproblems. In each subproblem, one of the N breakable arcs is removed from the problem statement, and thus will not be among the arcs in the solution to that problem. The cost of each subproblem cannot be lower than the cost of the problem that is able to use the arc that is broken in the subproblem. Because of optimization, the N subproblems produced at this point are of diminishing size and complexity. If arc (y,z) is broken in subproblem r, then it is forced to be in the solution for subproblems r+1,r+2,..., N. When an arc is forced to be in a solution for a specific subproblem, the subproblem has fewer arcs to place, and takes less time to solve than a subproblem without the forced arc.

In preparation for generating the subproblems, in step 130 the algorithm sets the values of minY[n] to −1. The vector minY[n] contains the index of node y in an arc $(y,z_n)$ for which the slack from node y to node $z_n$ is minimum among all arcs ending at $z_n$. The initial value of −1 indicates that no slack computation has been done yet. In step 150 the subproblem is tentatively made equal to the present problem. Now the algorithm is ready to enter the loop that generates up to N subproblems. The objective is to break an additional arc in each successive subproblem. The core of the invention is the selection of which arc to break. The invention chooses arcs in a way that produces a sequence of subproblems that are dramatically easier to solve than the sequences produced by prior art.

In step 160, the loop begins by testing the present subproblem to see if there are breakable arcs remaining. If none remain, the process stops generating subproblems, and exits to Point 3.

In step 200, the process begins by finding a breakable arc that satisfies the conditions required for this invention. The process breaks this arc (removes it from the subproblem) to generate the next subproblem to solve. In step 200, the value of highSlack is set to −∞ as an initial value, and it changes each time a higher value is discovered.

In step 210, the process sets the value of n to 1. In the loop that follows, the value of n changes from 1 to N to select arcs that terminate at node $z_n$. In step 220, the algorithm exits if n exceeds N, since all nodes $z_n$ will have been examined at that point. In step 230, the algorithm checks to see if the y node with smallest slack found happens to be a deadY node. The first time through the loop, this test is satisfied because of the initialization in steps 130 and 140. In subsequent loops, this test is satisfied when the y node is the first node of an arc (y,z) that has just been broken and removed from a subproblem. If the test is satisfied, the process performs the operations of step 240. This step computes the slack of all arcs that start at a y node and end at node $z_n$. The index of the y node with least slack is placed in minY[n], and the value of that slack is placed in minSlack[n].

Step 250 tests if the minimum slack for node $z_n$ exceeds the value of highSlack. If so, in step 260 the value of minSlack[n] replaces highSlack, and the process stores the value of n in highZ to remember which $z_n$ produced the highest minimum slack. This is an essential part of the invention.

In step 260, the process increments n to examine arcs that end on the next z node, $z_n$.

The loop exists at Point C. At this point, the process has identified a breakable arc $(y,z_n)$ that has minimum slack among all arcs that end at $z_n$ and has the greatest minimum slack among all minimum arc values.

In step 300, the process sets m to highZ. This is the index of the z node that will be removed from the subproblem. In step 310, the process locates the breakable arc connected to $z_m$. This arc is the arc that is to lie broken in the next subproblem.

In step 320, the process generates the next subproblem. First, it removes the breakable arc $(y_j,z_m)$ from the problem statement, and then it removes it from solution to that problem. Since slack values from node $y_j$ have to be recomputed in step 240, the process sets deadY to the value of j to retrigger that computation.

Next, the process generates a new lower bound for the subproblem. This bound is c′=C+highSlack where C is the cost of the solution before the arc was broken. Then the process places the newly generated subproblem on the queue. In preparing to generate additional subproblems, the process forces the arc $(y_j,z_m)$ to be present in all subsequent subproblems. It does this in step 320 by removing arcs $(y_j,z_h)$ for h≠m, and arcs $(y_h,z_m)$ for h≠j. This leaves arc $(y_j,z_m)$ as the only arc touching node $y_j$ and $z_m$, and forces this arc to be included in the solution.

At step 330, the process returns to step 160 to generate a new subproblem.

When subproblem generation is completed, the process goes to step 340, where the it increments i indicating that it has completed finding the ith best solution for the last value of i, and is now going to find the i+1st best solution. After increasing i, the process returns to step 40, to restart the loop that removes subproblems from the queue.

This heuristic process tends to insure that the largest problem will have the worst solution. It has the largest number of unassigned arcs, but because it has the highest lower bound, it is likely to be dropped from the queue before being solved completely. The next-largest subproblem made will tend to have the next-worst solution, and so on, until the smallest problem, which has a reasonable chance of having the best solution. While the heuristic is not perfect, it generally makes a huge difference in the sizes of problems chosen for partitioning.

This can be seen in FIG. 3, which gives the results of the same experiment as shown in FIG. 2, after implementing the heuristic. The tests were run on a 150 MHz R4400 microprocessor with all algorithms written in C.

Since both the solving and partitioning procedures are $O(N^2)$ there is a major reduction in computation time when the distribution of problem sizes is skewed to smaller values of N. Moreover, such skewing also reduces the total number of problems that have to be solved, since an N×N problem produces N subproblems after partitioning.

We have found that our optimization technique that has been described makes a marked, quantitative difference in the behavior of the algorithm. In fact, the performance of the fully optimized procedure is almost linear with respect to N. This is quite surprising, since the worst-case performance of the code implementing the optimization is itself $(O)(N^3)$.

The algorithm that we have described can be used in a variety of applications. It was originally devised for use in multi-target airport tracking where the blips in a radar screen would correspond to rows in the matrix and known planes being tracked forming the columns and one wishes to associate a particular blip to a specific plane as described in a paper entitled "An Algorithm for tracking multiple targets," in IEEE Trans. on Automatic Control AC-24 (6) 843–854, December 1979 by D. B. Reid.

Other possible applications include optimization of frequency assignment to satellites in a satellite communication system so that the largest interference may be minimized.

What is claimed is:

1. A computer-implemented process for ranking the best solutions to an assignment problem for which there is provided an N×N cost matrix in which its rows and columns denote specific members of two associated sets between which a match is to be made and the entries in the matrix represent the cost of the match of the two members represented by the row and column of the entry characterized in that the process includes the step of partitioning the cost matrix into a succession of N least cost assignment subproblems involving cost matrices of dimensions that are successively smaller by one and in a manner that each subproblem in the succession is the largest subproblem that has the highest lower bound of all subproblems that differ from its predecessor assignment problem by the removal of one assignment, the lower bound of a problem being derived by finding the minimum slack of all alternative assignments, so that the matching of the members of the two associated sets is ranked in order of cost.

2. A computer-implemented process for ranking the best solutions to an assignment problem for which there is provided an N×N cost matrix in which its rows and columns denote specific members of two associated sets between which a match is to be made and the entries in the matrix represent the cost of the match of the two members represented by the row and column of the entry comprising the steps of:

deriving from the matrix the least cost assignment by a shortest augmenting path process and determining the augmented variables of the least cost assignment;

partitioning the cost matrix into a succession of N least cost assignment subproblems involving cost matrices of dimensions that are successively smaller by one and in a manner that each subproblem in the succession is the largest subproblem that has the highest lower bound of all subproblems that differ from its predecessor assignment problem by the removal of one assignment, the lower bound of a problem being derived by finding the minimum slack of all alternative assignments;

initiating each subproblem to a state that is close to its terminal state by using the dual variables from a parent solution;

determining and then pruning subproblems that cannot produce a solution among the desired k-best solutions;

ordering solved and unsolved subproblems in a priority order such that the first in the order contains the problem with the least lower bound or cost or the least actual cost when actual cost is known;

removing from the queue the top of the queue; and saving each of the k-best solutions as each solution is identified as the next best solution so that the matching of the members of the two associated sets is ranked in order of cost.

3. The process of ranking the best matches between a first set of points, each point representative of a different feature in a scene and a second set of points, each point representative of one of the features in the scene in accordance with the process of claim 1 in which the first and second sets of points serve as the members of the first and second sets between which matches are to be ranked.

4. The process of ranking the most cost effective matches between a group of employees and a group of tasks where there is a cost that may be different in matching each employee to a particular task in accordance with claim 1 in which the employees are members of the first set and the tasks are members of the second set between which matches are to be ranked.

5. The process of ranking the most cost effective matches between a group of employees and a group of machines, where there is a cost that may be different in matching an employee to a machine in accordance with the process of claim 1 in which the employees are members of the first set and the machines are the members of the second set between which matches are to be ranked.

6. The process of multi-target airport tracking between blips in a radar screen and known planes being tracked in accordance with the process of claim 1 in which the blips form one set and the planes being tracked form the second set between which matches are to be ranked.

7. An article of manufacture for implementing a computer comprising a storage medium in which the process of claim 1 is stored.

8. The process of ranking the best matches between a first set of points, each point representative of a different feature in a scene and a second set of points, each point representative of one of the features in the scene in accordance with the process of claim 2 in which the first and second sets of points serve as the members of the first and second sets between which matches are to be ranked.

9. The process of ranking the most cost effective matches between a group of employees and a group of tasks where there is a cost that may be different in matching each employee to a particular task in accordance with claim 2 in which the employees are members of the first set and the tasks are members of the second set between which matches are to be ranked.

10. The process of ranking the most cost effective matches between a group of employees and a group of machines, where there is a cost that may be different in matching an employee to a machine in accordance with the process of claim 2 in which the employees are members of the first set and the machines are the members of the second set between which matches are to be ranked.

11. The process of multi-target airport tracking between blips in a radar screen and known planes being tracked in accordance with the process of claim 2 in which the blips form one set and the planes being tracked form the second set between which matches are to be ranked.

12. An article of manufacture for implementing a computer comprising a storage medium in which the process of claim 2 is stored.

\* \* \* \* \*